Dec. 16, 1969  R. C. MEYER  3,484,115
ADJUSTABLE TOOL CHUCK
Filed April 27, 1967  5 Sheets-Sheet 1
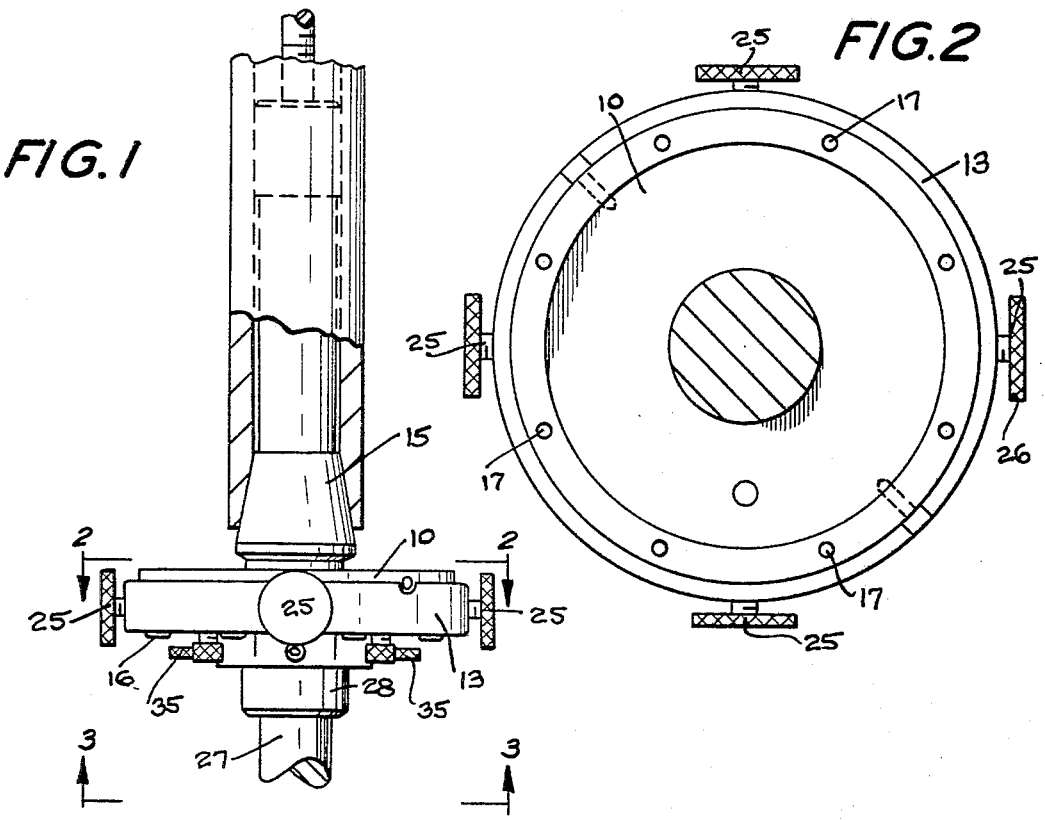
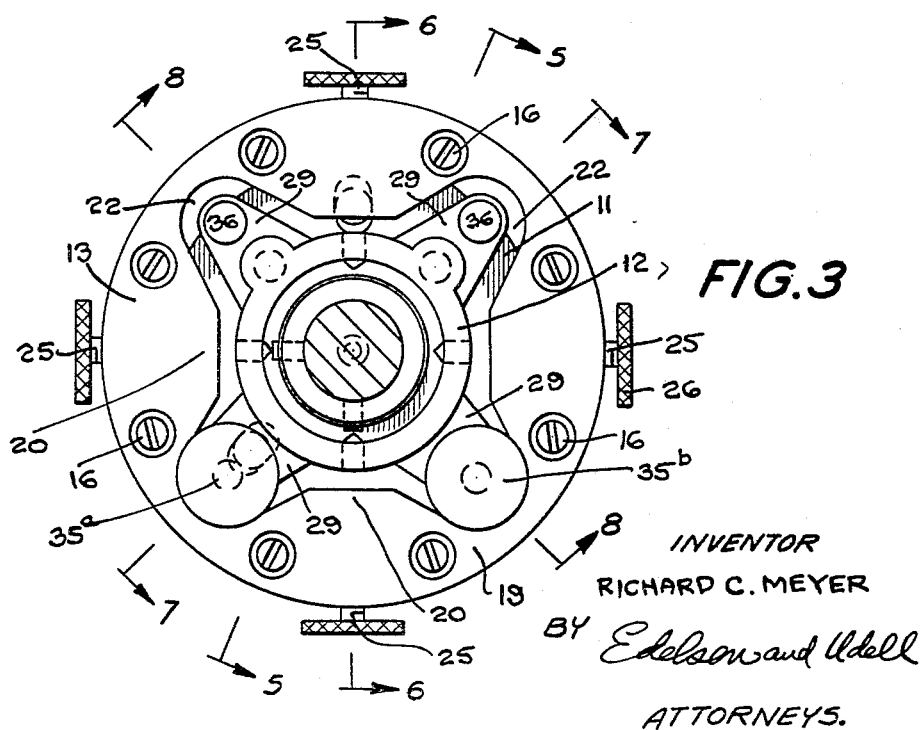
INVENTOR
RICHARD C. MEYER
BY Edelson and Udell
ATTORNEYS.

INVENTOR
RICHARD C. MEYER
BY Edelson and Udell
ATTORNEYS.

Dec. 16, 1969.            R. C. MEYER                3,484,115
                      ADJUSTABLE TOOL CHUCK
Filed April 27, 1967                           5 Sheets-Sheet 3

INVENTOR
RICHARD C. MEYER
BY Edelson and Udell
ATTORNEYS.

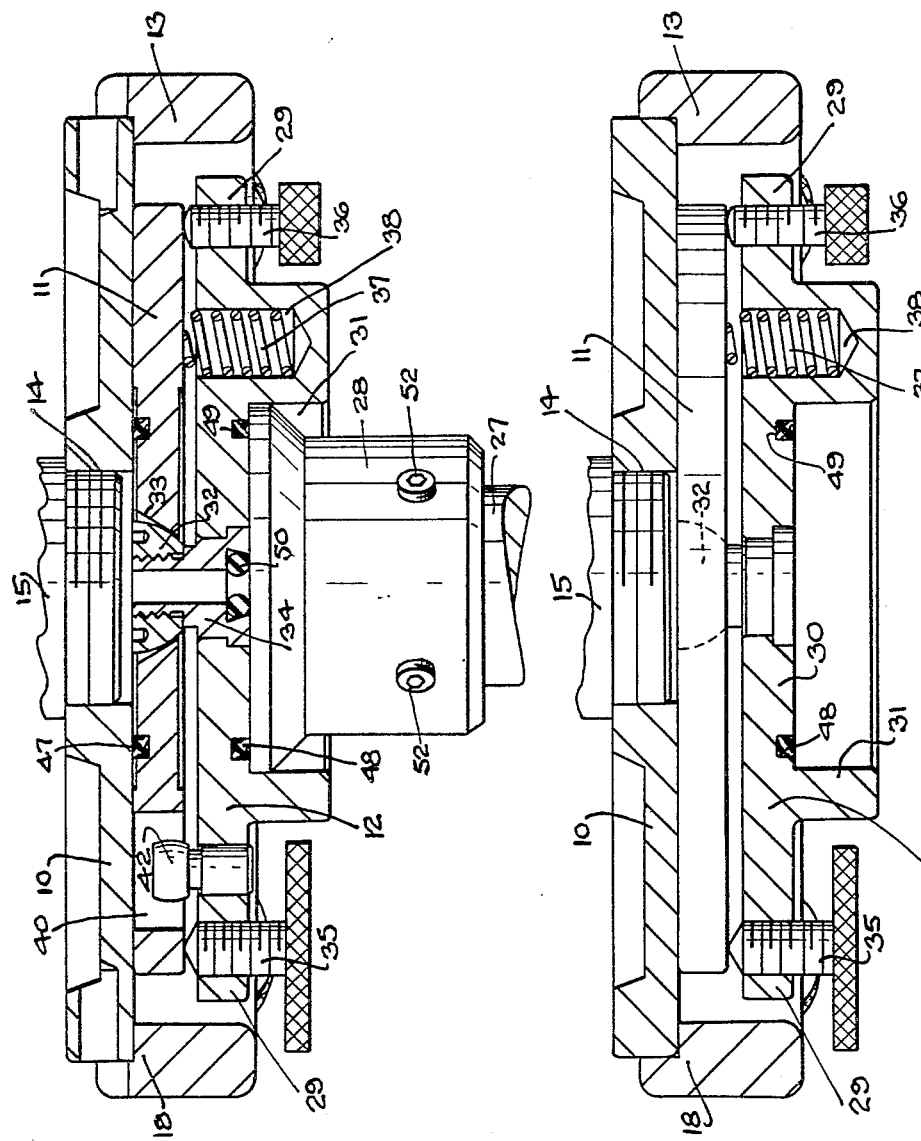

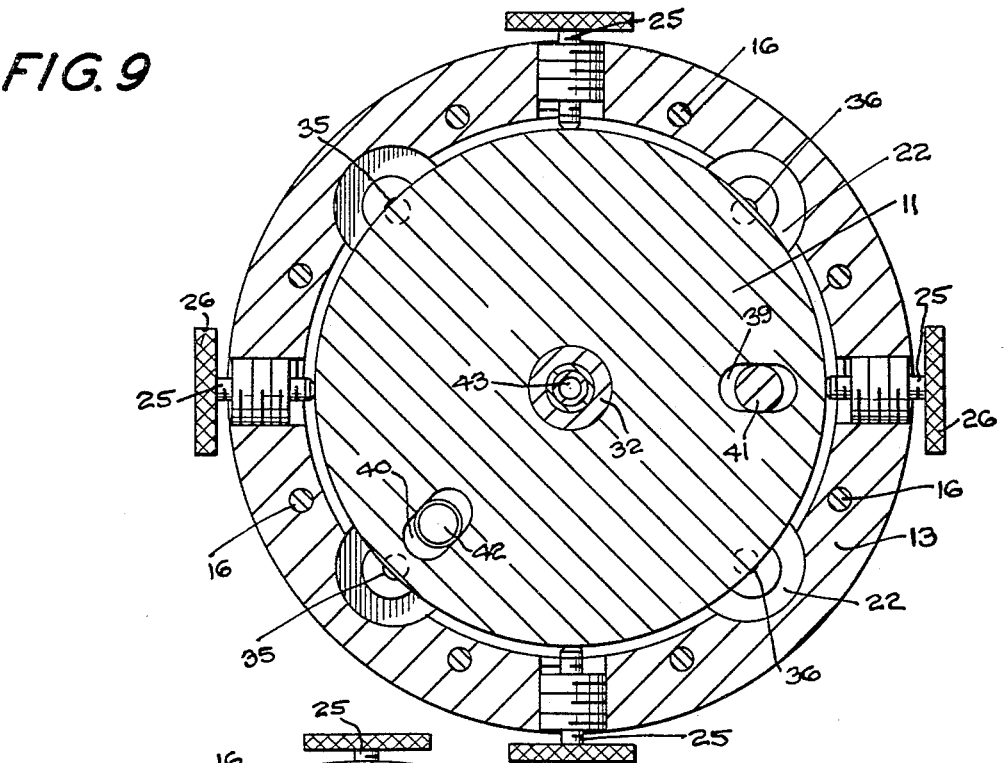
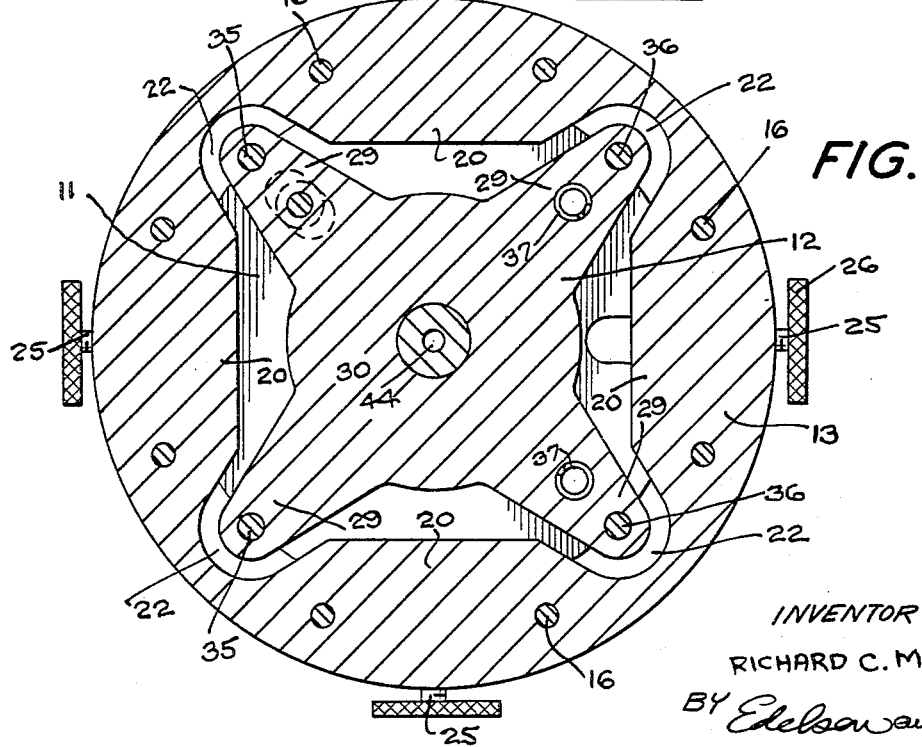

United States Patent Office 3,484,115
Patented Dec. 16, 1969

3,484,115
ADJUSTABLE TOOL CHUCK
Richard C. Meyer, Wanamaker and Baeder Roads,
Jenkintown, Pa. 19046
Filed Apr. 27, 1967, Ser. No. 634,158
Int. Cl. B23b 5/34, 5/22; B65g 3/22
U.S. Cl. 279—6                             15 Claims

ABSTRACT OF THE DISCLOSURE

A tool-holding chuck assembly for holding a tool, such as the electrode of an electrical discharge machine or the drill of a drill press, in axially adjusted position in relation to the spindle axis of the machine, which chuck includes a laterally movable shift plate for translatory movement of the tool horizontally with respect to the spindle axis and a pivoted tilt plate carried by the shift plate and in turn carrying the work tool, the tilt plate being swingable about two orthogonally related roll axes passing through the center of the tilt plate pivot, the tilt plate being adjustable first about one roll axis and then about the other to bring the tool axis into parallelism with the spindle axis of the machine, and the shift plate being adjustable laterally in a horizontal plane to effect axial registry of the tool and spindle shaft axes. Provision is made in the chuck assembly for securely locking the lateral shift plate and the swingable tilt plate in their respectively adjusted positions. In addition, the chuck assembly includes means to prevent rotational slip of both the lateral shift plate and the swingable tilt plate due to twisting forces applied to the workpiece, as well as means for circulating a flushing coolant through the spindle into the tool, e.g., a hollow electrode, to remove debris from the spark zone of an electrical discharge machine.

DESCRIPTION OF THE INVENTION

This invention relates generally to tool holders and more particularly to an improved construction of chuck having provision for accurately centering the axis of a tool held in the chuck in relation to and obtaining exact coincidence thereof with the spindle axis of a machine upon which the chuck is operatively mounted.

Among the principal objects of the present invention is to provide a tool chuck wherein is combined means for laterally shifting the axis of the chuck-mounted tool into adjusted position relatively to the machine spindle axis so as to insure their axial coincidence upon horizontal translatory movement of the tool held in the chuck.

A further object is to provide a chuck assembly for a tool wherein the tool may be adjustably swung in one direction or the other about each of two orthogonally related roll axes extending at right angles to the spindle axis, one such adjustable swing serving to present the tool axis in a first vertical plane paralleling the spindle axis and the other such adjustable swing serving to present the tool axis in a second vertical plane also paralleling the spindle axis but extending at right angles to the first vertical plane, whereby parallelism of the tool and spindle axes is assured.

Still another object of the present invention is to provide in a chuck of the character described both a tilt system and a transverse translatory system for the tool, each of which systems is independently adjustable but operate in combination to provide a high degree of accuracy in establishing axial coincidence between the axis of a rotatable spindle and the axis of the tool supported by the chuck, thereby insuring a high degree of accuracy in performing work upon a cylindrical work piece the axis of which is required to be exactly alined with the spindle axis.

Still further objects are to provide in the chuck a lateral shift plate and a pivoted tilt plate assembly which operate conjointly to mount the tool with its axis in proper relation to the machine spindle axis and which includes provision for precluding any tendency for the shift plate of the transverse translatory system and the tilt plate of the tilt system to shift rotationally within the chuck when subjeced to twisting forces applied to the workpiece; to provide means for circulating a flushing coolant through the machine spindle to and into a tool, such as a hollow electrode used in an electrical discharge machine, to remove debris accumulating in the spark zone of such machine; to provide a chuck assembly which is compact in its overall dimensions, is strong yet of such little weight as to reduce to a minimum its eccentric mass; and is readily adjustable without the use of special tools to obtain the requisite adjustment of the tool supported thereby.

Other objects and advantages of the invention will appear more fully hereinafter, it being understood that the present invention consists in the combination, construction, location and relative arrangement of parts, all as described in detail in the following specification, as shown in the accompanying drawings and as pointed out in the appended claims.

In the accompanying drawings:

FIGURE 1 is an elevational view of the adjustable chuck constructed in accordance with and embodying the principles of the present invention;

FIGURE 2 is a top plan view of the chuck as taken along the line 2—2 of FIGURE 1;

FIGURE 3 is a bottom plan view of the chuck as viewed from the line 3—3 of FIGURE 1;

Figure 6:
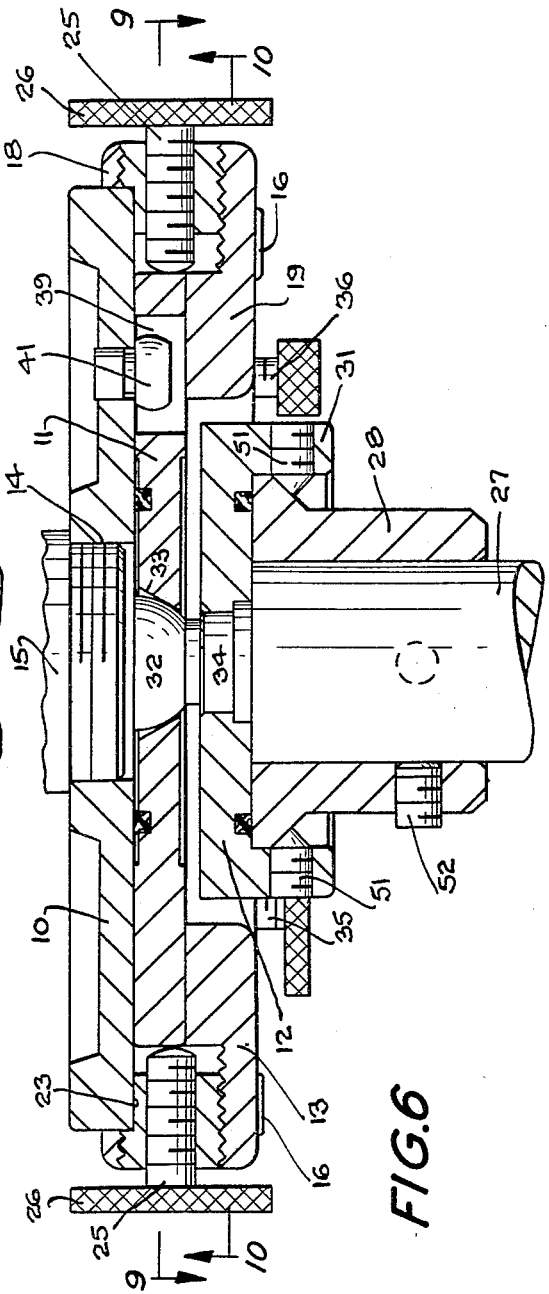

FIGURES 5 to 8 are transverse vertical sectional views as taken respectively along the lines 5—5, 6—6, 7—7 and 8—8 of FIGURE 3; and FIGURES 9 and 10 are horizontal sectional views as taken respectively along the lines 9—9 and 10—10 of FIGURE 6.

Referring now to the drawings, it will be observed that the chuck of the present invention essentially comprises an assembly of a top face plate 10, a lateral shift plate 11, a tilt plate 12 and a bottom retainer ring 13, the top face plate and bottom retainer ring being rigidly secured together to house therebetween the lateral shift plate and to support the tilt plate for positional adjustment thereof as will presently appear.

The face plate consists of a circular plate having an internally threaded central opening 14 adapted to receive the threaded end of a suitable spindle shank 15 fitted in the machine with which the chuck is to be used and which shank is adapted upon operation of the machine to be rotated about its vertical axis or held fixed against rotation for rectilinear movement toward the work along a line coincident with said vertical axis. In certain operations of the machine, with the spindle shaft rotating while held against rectilinear movement along its vertical axis, the work may be moved transversely of said axis.

Figure 4:
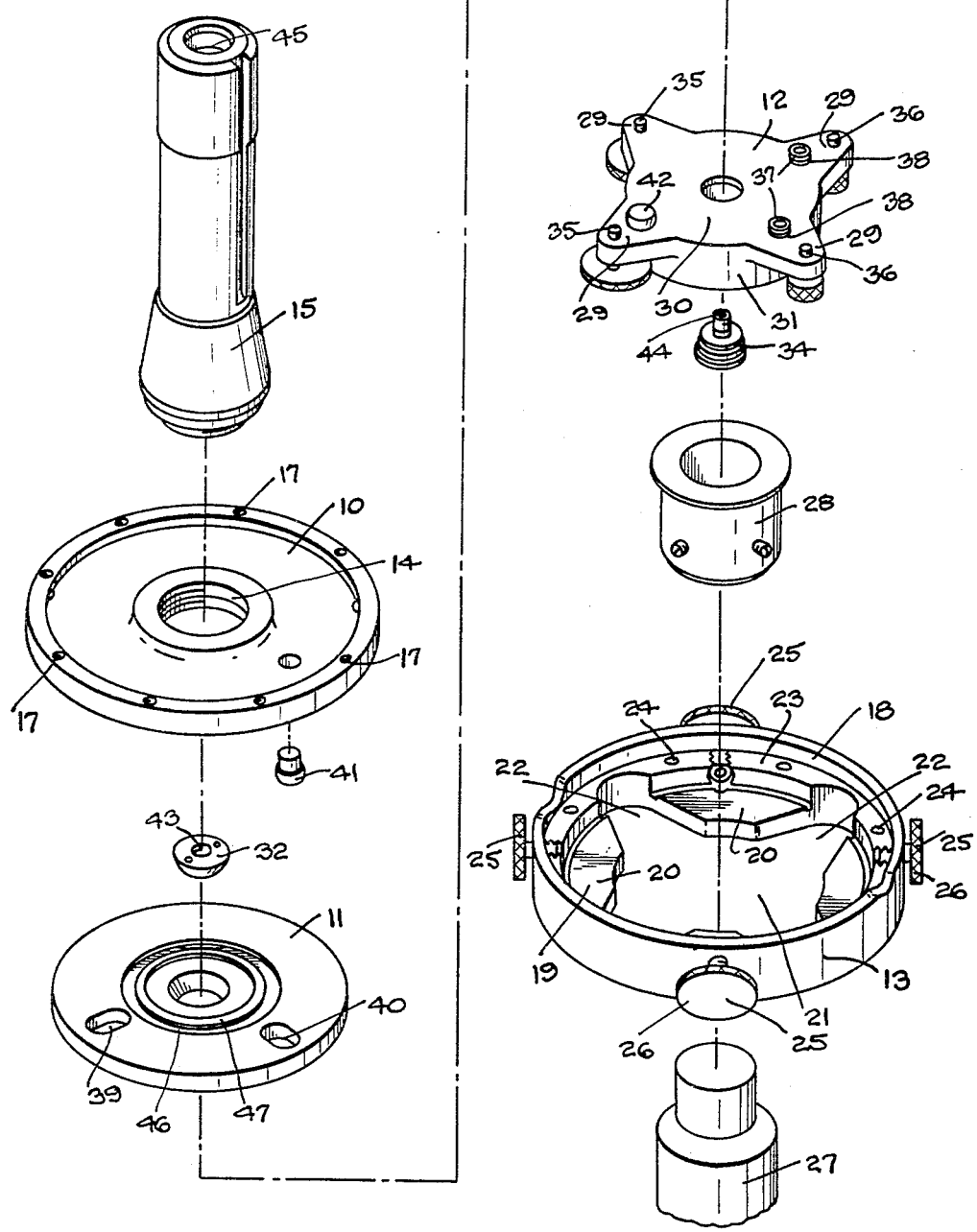
FIGURE 4 is an exploded view showing in perspective the several component parts of the chuck.
Figure 5:
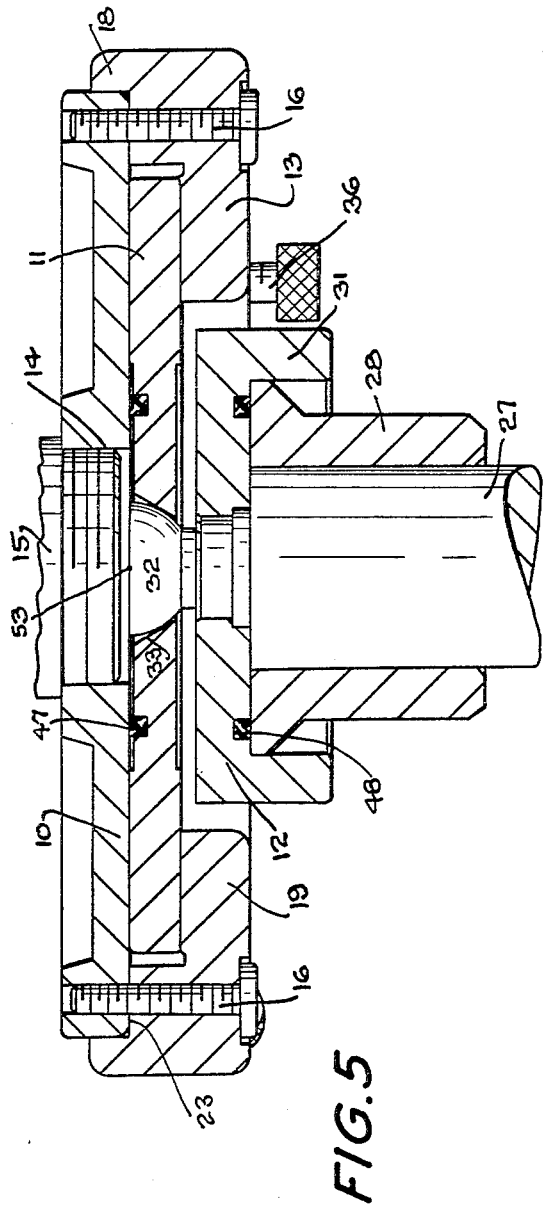

The bottom retainer ring 13, which is clamped to the top face plate 10 by a plurality of circumferentially spaced screws 16 threaded into screw holes 17 spaced about the marginal edge of the plate 10, is of the form best shown in FIGURE 4. As shown, this retainer ring 13 is of cup-shaped form having a circular wall 18 and a bottom wall 19 which is centrally cut out to provide a plurality of inwardly projecting lobes 20 to define a star-shaped opening 21 having four circumferentially spaced, radially projecting recesses 22. The upper end of the circular wall 18 is undercut to provide an annular shoulder 23 which serves as a seat for the face plate 10, the shoulder being apertured, as at 24, for projection therethrough of the screws which secure the plate 10 to the retainer ring. The depth of the shoulder 23 is such that when the face plate 10 and retainer ring 13 are clamped together by the screws 16 a recess is provided between the opposed inner faces of the face plate 10 and the retainer ring lobes 20 to snugly accommodate therebetween the lateral shift plate 11.

This shift plate 11 of an outside diameter slightly less than the internal diameter of the shoulder 23 so that said shift plate when secured in position between the face plate 10 and the cut out bottom wall of the retainer ring 13 has a capability of being laterally shifted relatively to the vertical central axis of the face plate and retainer ring assembly.

This lateral shift of the shift plate 11 is effected actually along two lines substantially orthogonal to one another by means of four shift screws 25 threaded into the circular wall 18 of the retainer ring in 90 degree spaced relation. These screws are each provided with enlarged heads 26 readily engageable externally of the retainer ring. The shanks of these adjustment screws which are all commonly disposed in the plane of the shift plate 11, are adapted to move into and out of engagement with the circular edge of the shift plate so that as one screw is backed away from the plate and its diametrically opposite screw is advanced toward the plate, the latter may be laterally shifted along the line common to said diametrically opposed screws. Thus, by first manipulating one pair of diametrically opposed screws and then the second pair thereof, the center of the shift plate 11 may be accurately adjusted in relation to the vertical axis of the machine-supported spindle shank 15.

This shift plate 11, which lies in a plane orthogonal to the vertical axis of the spindle shank 15, serves as the support for the work tool 27 mounted in the chuck through the intervention of the tilt plate 12 and a tool mounting adapter 28 carried by the tilt plate. The tilt plate 12, as is best shown in FIGURE 4, is in the form of a star-shaped member having four radially projecting arms 29 equally spaced circumferentially about its central main body portion 30. This main body portion is provided with an integrally formed downwardly projecting socket 31 within which may be fitted the adapter 28 or any other device suitably designed as a holder for a work tool 27 such as an electrode used in electrical discharge mahcines, drills and the like.

The upper surface of the tilt plate 12 is flat and adapted for disposition in closely spaced, parallel relation to the bottom surface of its supporting shift plate 11. When the tilt plate 12 is mounted upon the shift plate 11 in the manner and by the means to be presently described, the radially extending arms 29 of the tilt plate respectively nest in the complementally shaped radially projecting recesses 22 of the star-shaped opening 21 formed in the bottom wall of the retainer ring 13.

The tilt plate 12 is hingedly secured to the shift plate 11 by a pivot member 32 of semi-spherical shape resting in a tapered seat 33 centrally provided in the shift plate 11 in threaded engagement with a stud 34 which is fixed in and projects upwarly through the center of the tilt plate 12.

Two adjacent arms 29 of the tilt plate 12 are each provided with an upwardly projecting tilt adjustment screw 35 the inner end of which bears against the tilt plate 11, while the two remaining arms of the tilt plate are each provided with a tilt lock screw 36 the inner end of which is also adapted to bear against the tilt plate. The disposition of these screws is relatively such that one tilt adjustment screw 35 and its diametrically opposed lock screw 36 lie in a vertical plane which is orthogonal to that containing the other tilt adjustment screw and its diametrically opposed lock screw.

The tilt plate 12 is additionally provided in its upper surface, i.e., that which is contiguous to the bottom surface of its supporting shift plate 11, with a pair of coiled compression springs 37 each seated in a suitable socket 38 provided therefor. Each of these springs 37 is located adjacent a lock screw 36 and in the same plane which contains said adjacent lock screw and its diametrically opposed tilt adjustment screw 37.

In order to preclude any tendency of the shift plate 11 or of the tilt plate 12 to rotate relatively to the spindle shaft 15 or to one another due to any twisting force applied to the work tool mounted in the chuck and thereby insure maximum torque transmission between the machine spindle and the work piece, the shift plate 11 is provided with a pair of elongated slots 39–40 which respectively accommodate a downwardly projecting guide pin 41 fixed to the face plate 10 and an upwardly projecting guide pin 42 fixed to the tilt plate 12. These slots 39–40 are so relatively located and oriented that they respectively extend lengthwise along the two orthogonally related lines of lateral shift of the shift plate 11. Since each guide pin 41 and 42 acts in the nature of a pivot when adjusting the lateral shift screws for centering of the shift plate, the latter does not shift along truly rectilinear lines but rather along lines which are slightly arcuate. However, this deviation from truly straight line movement of the shift plate is minimal and the two shifts along lines extending substantially at right angles to one another conjointly provide for the shift plate a somewhat random motion which accurately centers the work tool with reference to the work piece. With the centering screws all tightened in their finally adjusted positions, rotational slip not only of the shift plate but also of the tilt plate is effectively precluded by the interengagement of the guide pins 39 and 40 in their respective slots 41 and 42.

It will be noted that the guide pin 42 carried by the tilt plate 12 is surface contoured to provide in effect a pivot ball which allows freedom for tilting movement of the tilt plate about a horizontal roll axis which extends through the center point of the tilt plate pivot member 32 and lies in that vertical diametric plane of the tilt plate passive through the guide pin 42.

An important feature of the chuck of the present invention is the provision therein of means for circulating a coolant fluid to the work-piece through the chuck and its associated spindle shaft. For such flushing of coolant through the chuck to the work-piece, the central pivot member 32 and its associated stud 34 for securement of the tilt plate 12 to the lateral shift plate are both axially bored, as at 43 of the member 32 and at 44 of the stud 34, for axial registry and communication with a central bore 45 provided in the spindle shaft 15 and a central bore extending through the work tool 27.

In order to seal the chuck for flow of the coolant solely through its center, the shift plate 11 is provided in its upper surface with an annular groove 46 in which is seated a sealing ring 47 to serve as a seal between the contacting surfaces of the face plate 10 and the shift plate 11. A second sealing ring 48 seated in a annular groove 49 formed in the base wall of the adapter-receiving socket 31 formed as an integral part of the tilt plate 12 supplemented by an O-ring seal 50 seated in the lower end of the pivot stud 34, serve as a seal to prevent leakage of the coolant outwardly from between the tilt plate and the adapter 28 fixed in its tilt-plate socket 31. This adapter 28, which may be of any suitable form to receive and hold the work tool 27 is secured in the chuck socket 31 by set screws 51, while the tool 27 is itself secured in the adapter by the set screws 52.

Operation of the chuck

Having mounted the chuck of the present invention upon the machine with which it is to be used by way of the spindle shank 15, and assuming, of course, that the axis of the spindle shank is truly vertical, the lateral shift plate in the chuck assembly will be disposed in a horizontal plane. However, the work tool 27, such as an electrode for an electrical discharge machine or a drill for a conventional drill press carried by the chuck, may not be in truly axial alinement with or otherwise centered in relation to the spindle shank.

Assuming the spindle shank is rotational, and that the need is to obtain axial coincidence between the rotational axes of the spindle shank and the work tool carried by the chuck, the tilt adjusting system of the chuck as above described is used in the following manner.

First, one of the two tilt adjusting screws 35—35 e.g., that designated 35a in FIGURE 3, is axially adjusted to swing the tilt plate 12 about a horizontal roll axis extending through the central pivot point 53 (see FIGURE 5) of the pivot member 32 and disposed in the vertical plane of the line 8—8 of FIGURE 3. The compression spring 37a opposite the adjustment screw 35a exerts a bias resisting tilt of the tilt plate under pressure of the screw 35a against the shift plate 11. Thus, as the adjustment screw 35a is backed away from the shift plate 11, the spring-pressed end of the tilt plate is urged outwardly under the pressure of the spring 37a whereas when the adjustment screw 35a is adjusted inwardly toward the shift plate, the spring-pressed end of the tilt plate is urged inwardly toward the shift plate against the resisting pressure of the spring 37.

By such axial adjustment of the first tilt adjustment screw (e.g. screw 35a in FIGURE 3), the axis of the tool 28a carried by the tilt plate 12 will be brought into a vertical plane parallel to the spindle axis and coinciding with the vertical plane of the section line 8—8 of FIGURE 3. However, while so located in such plane, the tool axis may still be inclined relatively to the axis of the spindle shank 15, and to correct for this deviation, the second tilt adjustment screw (designated 35b in FIGURE 3) is manipulated to now swing the tilt plate 12 in one direction or the other about a second horizontal roll axis extending through the pivot ball center 53 and disposed in the vertical plane of the section line 7—7. As in the case of the first tilt adjustment by means of the screw 35a, this second tilt adjustment is effected by operation of the tilt screw 35b acting in conjunction with its own biasing compression spring 37b and swings the tilt plate to present the axis of the tool 27 in a second vertical plane also parallel to the spindle axis but extending at right angles to that into which the tool axis was brought by the first tilt adjustment.

It will be understood of course that as each of these two tilt adjustments is made the tilt plate 12 is locked in its adjusted position by the lock screw 36 located diametrically opposite the particular tilt screw 35 employed for each such adjustment, and thus the tilt plate 12 is immobilized against swinging movement about either of its above mentioned orthogonally related roll axes. In this immobilized condition of the tilt plate, the tool 27 carried thereby will be positioned with its axis paralleling that of the spindle shank.

In order now to bring the parallel axis of the tool and spindle shank into exact axial coincidence, as would be required in the case of a machine in which the spindle shank was rotational, the shift plate 11 is laterally adjusted by means of the lateral shift screws 25. This translatory movement of the shift plate is employed to shift its center into registry with the spindle shank axis and when so properly centered, the tool axis is in axial alinement with the spindle axis of the machine.

The chuck of the present invention is applicable for use with stationary (i.e. non-rotating) tools in machines wherein the spindle shank is held locked against rotation. For such use, the tilting adjustments above described are made to insure exact parallelism of the machine spindle and the chuck-carried tool axes and the translatory adjustment of the lateral shift plate is made only as required to present the tool axis in coincidence with its point of application to the work-piece, which point may be on or off center in relation to the spindle shank axis.

In all cases the shift plate is held secure against any tendency for rotational slip thereof due to the twisting force applied to the work-piece by the oppositely projecting anti-rotational pins respectively carried by the face plate and the tilt plate and projecting into slots provided in the shift plate. This is especially important in machining applications using heavy electrodes or other work tools requiring the utmost rigidity. Also, particularly in connection with the use of electrodes in electrical discharge machines, the provision for flushing coolant through the spindle shank and into the hollow electrode to remove debris from the spark zone is an important feature of the present invention.

It will be understood that the present invention is subject to various modifications and changes which may be made from time to time without departing from the general principles or true spirit thereof. Thus, for example, the pivot means disclosed for tiltably hinging the tilt plate to the shift plate may be replaced by any other suitable designed pivot means, as by use of a pivot ball held in compression against a tapered seat formed in the bottom surface of the shift plate by an adjustable spring-biased stem extending upwardly through said plate. Also, where a flushing coolant is not required, the bore through the pivot ball and the sealing rings between the top face plate and the tilt plate and between the tilt plate and the tool adaptor might be dispensed with. Accordingly, it is intended to claim the invention broadly, as well as specifically, as indicated by the appended claims.

What is claimed as new and useful is:

1. A tool-holding chuck assembly of the character described comprising in combination a first member having a planar face, a second member having a planar face in flatwise engagement with the planar face of said first member, retainer means for holding said second member captive in relation to said first member while allowing limited lateral shift of said second member relatively to said first member with the planar faces of said members held in their said flatwise engagement, tool-holding means pivotally connected to said second member for mounting a work tool having a definable longitudinal axis with its said axis extending in intersecting relation to the planar face of said first member, means for effecting tilt adjustment of said tool-holding means to present said longitudinal axis of the work tool in predeterminedly desired angular relation to the planar face of said first member, and means for precluding rotational slip of said second member relatively to said first member due to any twisting force applied by the tool to a work piece.

2. A chuck assembly as defined in claim 1 wherein said first and second members are each in the form of a circular, substantially flat member and said retainer means is in the form of a member having a circular wall circumferentially embracing the peripheral edges of said first and second members and a bottom wall centrally cut-out to provide a plurality of inwardly presenting, circumferentially spaced coplanar lobes overlying the outer surface of said second member.

3. A chuck assembly as defined in claim 1 wherein said first member is in the form of a substantially flat disc having means for securement thereof to the spindle shank of a machine in centered relation to the axis of said spindle shank, and said retainer means is generally cup-shaped to provide the same with an annular wall closely embracing the peripheral edge of said disc and a centrally open base wall which is undercut to provide an annular seat for said second member, said base wall being provided with a plurality of circumferentially spaced inwardly presenting lobes which overlie said second member and hold it captive between said first member and said lobes of said retainer means.

4. A chuck assembly as defined in claim 1 wherein said retainer means includes inwardly presenting lobes spaced from the planar surface of said first member to provide in said retainer means a cavity within which said second member is held captive, said second member being of an overall dimension less than that of said cavity to permit lateral shifting of said second member within said cavity, said retainer ring being provided with adjusting means for effecting said lateral shift of said second member relatively to said first member.

5. A chuck assembly as defined in claim 1 wherein said pivotal connection is axially bored to provide a passage therethrough for a debris flushing coolant.

6. A chuck assembly as defined in claim 1 wherein said anti-rotational slip means consists of a pin fixed to and projecting from said first member into a slot provided in said laterally shiftable second member.

7. A chuck assembly as defined in claim 6 wherein said slot is elongated and disposed with its longitudinal axis substantially coincident with a permissible line of shift of said second member.

8. A chuck assembly as defined in claim 1 wherein said pivotal connection between said laterally shiftable second member and said tool-holding means includes a spherically-shaped part held in a tapered seat provided in said second member and secured to said tool-holding means, said tilt adjustment means is operative to swing said tool-holding means about each of two orthogonally related roll axes to bring the longitudinal axis of the work tool into parallelism with the axis of the spindle shank of a machine upon which the chuck assembly is mounted, and said tool-holding means is laterally shiftable with said second member to bring the longitudinal axis of the work tool into axial coincidence with the axis of the machine spindle shank.

9. A chuck assembly as defined in claim 8 wherein said tilt adjusting means includes for each of said roll axes a biasing element interposed between said tool-holding means and said second member and a coacting adjustable element adapted to bear against said second member in opposition to said biasing element, each biasing element and its coacting adjustable screw being spaced at opposite sides of the center of said pivotal connection along a line extending through said pivot center coincident with one of said roll axes.

10. A chuck assembly as defined in claim 9 wherein said biasing element comprises a coiled compression spring seated in a socket formed in said second member.

11. A chuck assembly as defined in claim 9 wherein said adjustable element comprises a screw axially projecting through said tool-holding means and adapted to have its lead point bear against said second member.

12. A chuck assembly as defined in claim 9 including means for locking said tool-holding means in its tilt-adjusted position about each of its said roll axes.

13. A chuck assembly as defined in claim 12 wherein said tilt locking means comprises for each said pair of coacting elements an axially adjustable screw adapted to bear against said second member at a point located in line with its associated pair of said coacting elements.

14. A chuck assembly as defined in claim 13 including means for precluding rotational slip of said laterally shiftable second member relatively to said tool-holding means.

15. A chuck assembly as defined in claim 14 wherein said anti-rotational slip means consists of a pin fixed to and projecting from said tool-holding means into a slot provided in said laterally shiftable second member, which slot is elongated and disposed lengthwise along a line coincident with a permissible line of shift of said second member.

References Cited

UNITED STATES PATENTS

| | | | |
|---|---|---|---|
| 21,982 | 11/1858 | Saxe. | |
| 943,063 | 10/1909 | Cooke | 248—178 |
| 2,833,544 | 5/1958 | Blades | 279—6 |

ROBERT C. RIORDON, Primary Examiner

U.S. Cl. X.R.

248—181